Nov. 12, 1968   D. M. HAUSEN ETAL   3,410,652
PRODUCTION OF VANADIUM TRIOXIDE
Filed Jan. 24, 1968   2 Sheets-Sheet 1
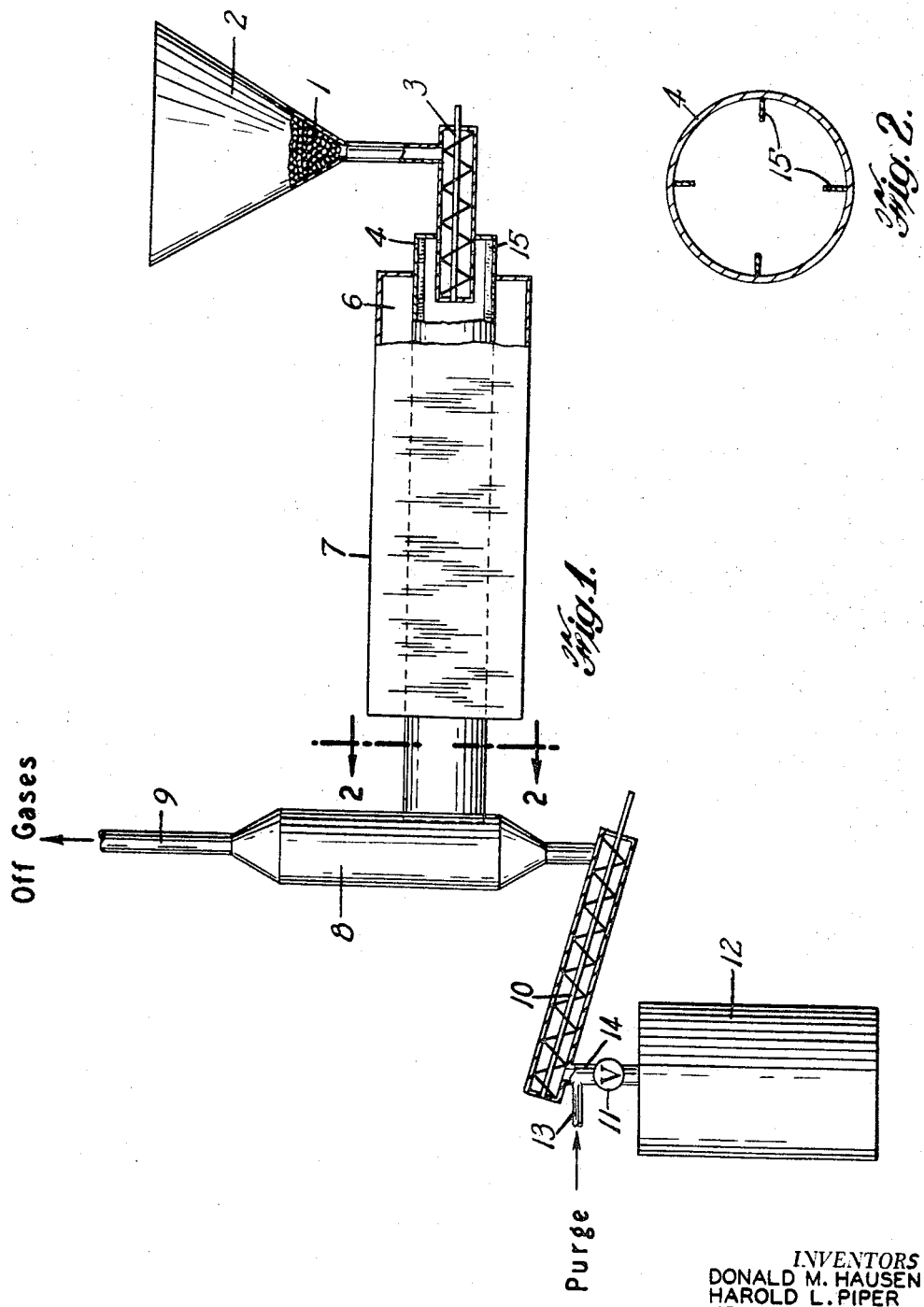
INVENTORS
DONALD M. HAUSEN
HAROLD L. PIPER
JOSEPH RUZYCKI
BY *[signature]*
ATTORNEY

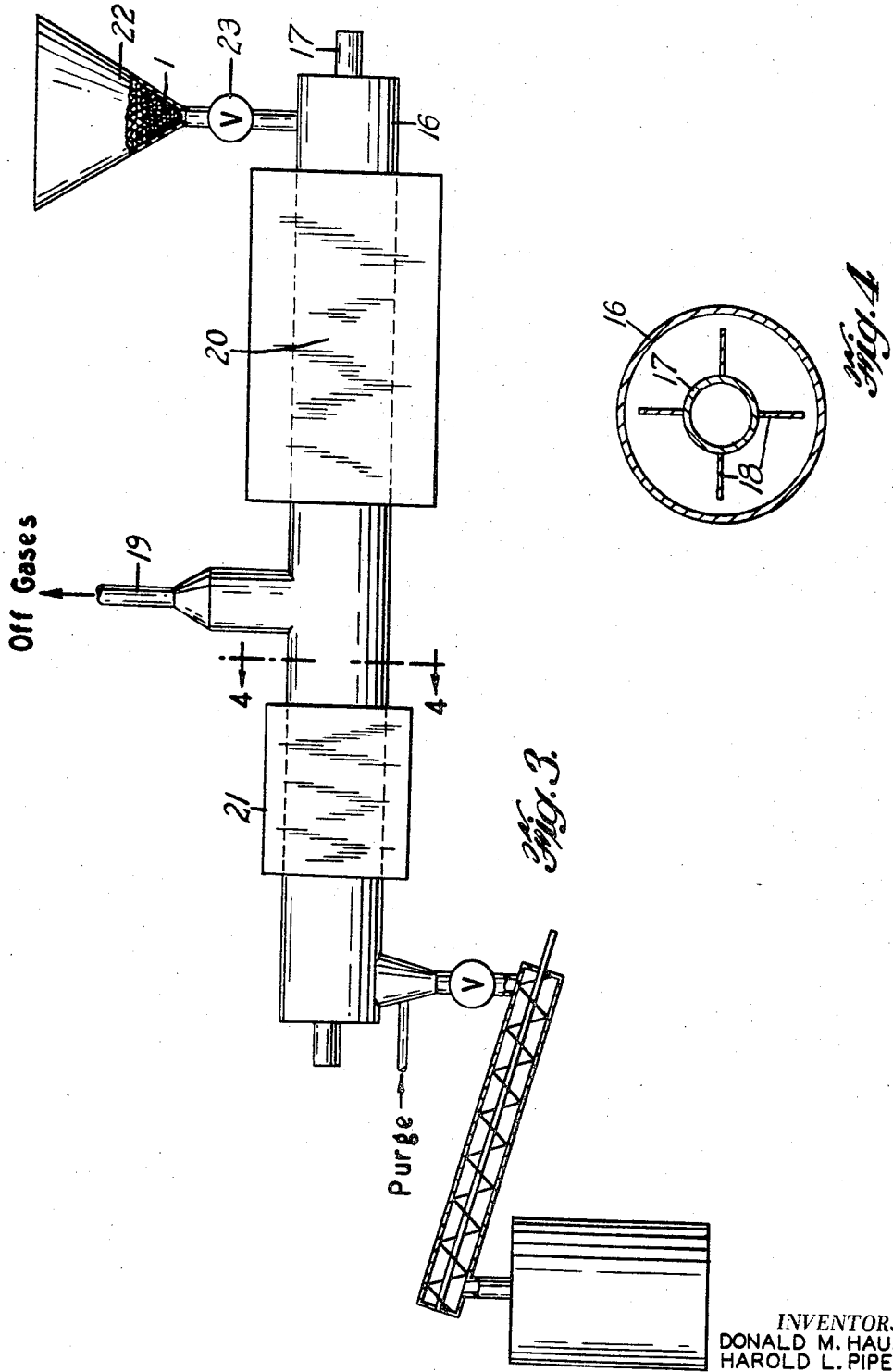

United States Patent Office 3,410,652
Patented Nov. 12, 1968

3,410,652
PRODUCTION OF VANADIUM TRIOXIDE
Donald M. Hausen, Danbury, Conn., and Harold L. Piper and Joseph Ruzycki, Grand Junction, Colo., assignors to Union Carbide Corporation, a corporation of New York
Continuation-in-part of application Ser. No. 344,860, Feb. 14, 1964. This application Jan. 24, 1968, Ser. No. 700,274
2 Claims. (Cl. 23—21)

ABSTRACT OF THE DISCLOSURE

Continuous process for producing a vanadium oxide product from ammonium metavanadate without the use of other reactants, which product contains $V_2O_3$ as the only oxide material detectable by X-ray diffraction analysis.

---

This application is a continuation-in-part of Ser. No. 344,860 filed Feb. 14, 1964.

This invention relates to a process for the production of vanadium trioxide from ammonium metavanadates. More particularly, it relates to a continuous process for thermally reducing ammonium metavanadate, $NH_4VO_3$, hereafter designated as AMV, to substantially pure vanadium trioxide, $V_2O_3$.

Heretofore vanadium trioxide has been prepared by the reduction of vanadium pentoxide, $V_2O_5$ in the presence of hydrogen gas, i.e. molecular hydrogen, at an elevated temperature. The process of this invention presents definite advantages over the prior art by preparing $V_2O_3$ from ammonium metavanadate which contains sufficient ammonia within the molecule itself to provide more than enough hydrogen to achieve complete reduction to $V_2O_3$ without the addition of external reducing agents. AMV requires a shorter reaction time and a slightly lower reaction temperature for complete thermal reduction to $V_2O_3$ than does $V_2O_5$. It is believed that the reduction of AMV to $V_2O_3$ is more rapid than the prior art method of reducing $V_2O_5$ because of the presence of nascent or atomic hydrogen, resulting from the thermal decomposition of ammonia. It is believed that the nascent hydrogen constitutes the active reducing agent and is more highly reactive than molecular hydrogen.

It is an object of this invention to provide a continuous and efficient process for the production of high purity $V_2O_3$ from AMV which does not require the use of any other reducing agent, i.e. where AMV constitutes the sole reactant or starting material.

It is another object of this invention to provide a continuous and efficient process for the production of high purity of $V_2O_3$ from AMV whereby the latter is reduced by the hydrogen produced by thermally cracking the ammonia liberated by heating AMV.

It is still another object of this invention to provide a continuous and efficient process for the production of high purity $V_2O_3$ from AMV which virtually eliminates contamination of the product by vanadium nitrides.

These and other objects are achieved by the process which will be described in greater detail below.

According to this invention AMV is reduced to $V_2O_3$ by the hydrogen resulting from the decomposition of ammonia contained in AMV. This reduction is accomplished at an elevated temperature in a reactor which prevents the product from coming in contact with air until after the product has been cooled sufficiently to prevent its reoxidation. The concurrent flow of the solids and gases produced therefrom in the continuous process is an important feature of this invention. It provides the reaction time necessary for the ammonia to thermally decompose and liberate hydrogen, for the hydrogen to accomplish the reduction of the vanadium compounds to $V_2O_3$, and also permits utilization of water vapor formed during the reaction to hydrolyze any nitrides which may be formed.

The thermal reduction or pyrolysis of ammonium metavanadate is relatively complex, and is accompanied by a number of endothermic and exothermic phase changes which have been investigated by means of differential thermal analysis and X-ray diffraction analysis of the calcined products. While not wishing to be bound by any theory, it is believed that ammonium metavanadate is initially converted to ammonium hexavanadate, $(NH_4)_2V_6O_{16}$ in the temperature range of from 150–240° C. and is accompanied by the evolution of ammonia and water vapor. Additional ammonia is liberated as the temperature is raised to 320–350° C. as a result of the decomposition of ammonium hexavanadate into ammonium vanadyl vanadate, $(NH_4)_2O \cdot 2V_2O_4 \cdot 5V_2O_5$. Partial reduction of the pentavalent vanadium to tetravalent vanadium is attributed to the presence of nascent hydrogen formed by the partial cracking of ammonia at this temperature. Ammonium vanadyl vanadates undergo further thermal decomposition in the range of 380–420° C. releasing the remaining ammonia, which in turn is cracked yielding additional nascent hydrogen. Further reduction yields mixed tetra-pentavalent oxides having the formula $2V_2O_4 \cdot V_2O_5$. Reduction of the latter to $V_2O_4$ is largely completed at about 480–500° C. Further reduction to the tritetravalent oxides, and finally to the trioxide, $V_2O_3$ occurs between 500 and 600° C. The final reduction from mixed tritetravalent oxides to vanadium trioxide is relatively slow, but may be accelerated by raising the temperature above 600° C. Cooling in an inert or reducing atmosphere to temperatures below 180° C. is necessary to prevent reoxidation of the vanadium trioxide.

In the reactor used for this process the solids and gases produced therefrom move concurrently through the hot zone of the reactor. Consequently, water vapor produced by the reaction comes continually in contact with the reduced product throughout at least the hot reaction zone. The presence of the water vapor during the final stages of vanadium trioxide reduction tends to hydrolyze any nitrides of vanadium that may form at elevated temperatures, and thereby minimizes the amount of nitrides in the final product. The reaction off-gases may be removed from the reactor by venting or flaring them either at the downstream end of the hot zone or at the downstream end of the reactor. The solids proceed downstream from the hot zone to a cooling section or separate cooling device such as a screw conveyor. The latter may optionally contain a countercurrent inert gas purge (such as ammonia or argon) to remove any residual water vapor. The cooled solids are discharged from the reactor or cooling device through a valve, such as a rotary type which provides an air seal.

In order to more fully describe the invention, reference is made to the drawing in which:

FIGURE 1 is a schematic partially sectional view of the preferred embodiment of the continuous reactor employed in the process of this invention;

FIGURE 2 is a cross-sectional view of the reactor shell taken along the line 2—2 in FIGURE 1;

FIGURE 3 is a schematic partially sectional view of an alternative embodiment of the reactor employed in the process of this invention; and FIGURE 4 is a cross-sectional view of the reactor shell and shaft taken along the line 4—4 of FIGURE 3.

Referring to FIGURE 1, the starting material 1, granular AMV is poured into feed hopper 2. This material falls by the action of gravity into a screw conveyor 3 which is used to control the feed rate of AMV to the reactor.

The screw conveyor 3 discharges the AMV into a rotating shell reactor 4. Shell 4 may be rotated by any conventional rotating drive means. The solids travel down the length of the rotating shell 4, first passing through the hot section 6 surrounded by an oven 7. The solids are discharged from the rotating shell 4 into a discharge breeching 8 from which the off-gases are vented or flared through pipe 9. The solids are borne from the bottom of the discharge breeching 8 by the cooling screw conveyor 10 in which the solids are cooled before discharging through rotary valve 11 into the product drum 12. The reactor is airtight in the space between the feed screw conveyor 3 and the discharge rotary valve 11, and is under some positive pressure due to gas formation therein, so that no air comes in contact with the product until after it is discharged from rotary valve 11 although as shown in the drawing the pressure in shell 4 is substantially atmospheric due to venting at 9. The optional inert gas purge inlet pipe 13 communicates with shute 14. The purge gas is vented from the reactor together with the off-gases and water vapor through pipe 9. Drive means for the rotary valves, screw conveyors and rotating shell have not been shown since these are well known to those skilled in the art and per se form no part of this invention.

Referring to FIGURE 2, it can be seen that the rotating shell 4 has four equally spaced lift vanes 15 attached to the inside of the shell. These lift vanes may be welded or otherwise suitably attached to the inside of rotary shell 4. Each of said vanes is spaced equidistantly from its adjacent vanes and each extends axially the full length of the rotating shell 4. The number of such vanes as well as their size may be varied considerably, as long as they function to keep the solids mixed and in intimate contact with the gaseous atmosphere in the shell. The vanes also aid in moving the solids through shell 4. In order to provide further assistance in moving the solids downstream through shell 4, the latter may be inclined downward in the direction of flow at a slope of up to ¼ inch per foot of reactor length; preferably 1/16 inch per foot. The size of the reactor may be varied depending upon the capacity desired.

A modification of the reactor is illustrated in FIGURES 3 and 4. It will be apparent that operation of this modified reactor is substantially the same as that described in FIGURE 1, consequently, only the differences between the two reactors will be described. In FIGURES 3 and 4, the shell 16 is stationary and the solids are moved through the shell by a rotating shaft 17 to which equally spaced lift vanes 18 are attached parallel to the axis of the shaft 17. The vanes 18 run the full length of shaft 17. Another point of distinction between the reactors is that a cylindrical chimney 19 is attached to shell 17 just downstream of the heat zone 20. The reaction off-gases pass out through chimney 19 and may be flared or simply vented to the atmosphere. Downstream of chimney 19, the reactor shell 16 is provided with a cooling jacket 21 which cools the product prior to its becoming exposed to the atmosphere. It will also be seen from FIGURE 3 that the granular starting material 1 is fed from hopper 22 directly into the stationary shell 16 through a rotary valve 23 which is used for controlling the feed rate to the reactor.

Operating conditions of reactors such as shown in FIGURE 1 and FIGURE 3 will vary depending on their particular size and geometry. Table I below describes the maximum, minimum and preferred operating conditions for a reactor with a 10 inch inside diameter, while Table II below describes the operating conditions for a reactor having a 6 inch inside diameter.

TABLE I

| Operating Condition | Maximum | Minimum | Preferred |
|---|---|---|---|
| AMV feed rate, lb./hr | 80 | 1 | 75 |
| Lifter rotations, r.p.m | 20 | 2 | 10 |
| Kiln slope, in./ft | 1/4 | 0 | 1/16 |
| Hot zone bed temperature, °C | 950 | 580 | 800–900 |
| Product temperature, °C. (at discharge end of reactor) | 170 | 15 | 95 |

TABLE II

| Operating Condition | Maximum | Minimum | Preferred |
|---|---|---|---|
| AMV feed rate, lb./hr | 16.5 | 1 | 15 |
| Kiln rotation, r.p.m | 15 | 1 | 10 |
| Kiln slope, in./ft | 1/8 | 1/16 | 1/16 |
| Hot zone bed temperature, °C | 950 | 580 | 800–900 |
| Product temperature, °C. (at discharge end of reactor) | 170 | 15 | 95 |

The vanadium trioxide produced by the above process contains less than 0.01 percent nitride. $V_2O_3$ is the only phase detectable by X-ray diffraction. By the process of this invention $V_2O_3$ can be prepared which is suitable for the manufacture of very pure vanadium metal and other vanadium compounds.

What is claimed is:
1. A continuous process for producing a vanadium oxide material in which the only oxide material detectable by X-ray diffraction is $V_2O_3$, said process comprising:
   (1) passing a charge consisting of ammonium metavanadate continuously through a zone heated to a temperature of 580° C. to 950° C. in the absence of oxygen to cause thermal decomposition of ammonium vanadate in said zone and the production of gaseous by-products,
   (2) confining said gaseous by-products in said zone to provide a reducing atmosphere which is substantially entirely formed of said gaseous by-products and which is at substantially atmospheric pressure,
   (3) maintaining the ammonium vanadate charge in contact with said reducing atmosphere in said zone at a temperature of 580° C. to 950° C. in the absence of oxygen for a time sufficient to reduce the ammonium vanadate to $V_2O_3$, and
   (4) withdrawing the $V_2O_3$ thus obtained from said zone and cooling said $V_2O_3$ to below 180° C. prior to exposure to an oxygen containing atmosphere.
2. A process in accordance with claim 1 wherein the zone is heated to a temperature in the range of 800° C. to 900° C.

References Cited

UNITED STATES PATENTS

| 2,702,739 | 2/1955 | Kelly | 23—140 |
| 2,776,871 | 1/1957 | Kelly | 23—140 |
| 3,333,916 | 8/1967 | Burwell | 23—21 |

FOREIGN PATENTS 302,129  12/1928  Great Britain.

OTHER REFERENCES

Ditte: "Comptes Rendus," vol. 101, December 1885, pp. 1487–1490.

Mellor: "A Comprehensive Treatise on Inorganic and Theoretical Chemistry," vol. 9, Longmans, Green & Co., New York, 1929, p. 741.

Satava: "Collection of Czechoslovak Chemical Communication," vol. 24, July 1959, pp. 2172–2181.

OSCAR R. VERTIZ, *Primary Examiner.*

H. T. CARTER, *Assistant Examiner.*